United States Patent [19]

Pearson

[11] 4,014,279
[45] Mar. 29, 1977

[54] DYNAMIC POSITIONING SYSTEM FOR A VESSEL CONTAINING AN OCEAN THERMAL ENERGY CONVERSION SYSTEM

[75] Inventor: Russell O. Pearson, Redondo Beach, Calif.

[73] Assignee: TRW Inc., Redondo Beach, Calif.

[22] Filed: Apr. 28, 1976

[21] Appl. No.: 681,003

[52] U.S. Cl. ............................ 114/270; 60/641; 114/151; 115/12 R; 115/14

[51] Int. Cl.$^2$ ...................................... B63B 35/00

[58] Field of Search ............. 114/.5 R, 144 B, 151; 9/8 P; 60/641; 61/19, 20; 115/11, 12 R, 14

[56] References Cited
UNITED STATES PATENTS

| | | | |
|---|---|---|---|
| 2,305,823 | 12/1942 | Wotschke | 115/14 |
| 3,116,709 | 1/1964 | Kampff | 115/11 |
| 3,805,515 | 4/1974 | Zener | 60/641 |
| 3,835,806 | 9/1974 | Rice | 115/12 R |
| 3,837,308 | 9/1974 | Harvey et al. | 114/.5 R |
| 3,967,449 | 7/1976 | Beck | 60/641 |

Primary Examiner—Trygve M. Blix
Assistant Examiner—Sherman D. Basinger
Attorney, Agent, or Firm—Daniel T. Anderson; Jerry A. Dinardo; Donald R. Nyhagen

[57] ABSTRACT

A dynamic positioning system for a sea-going vessel containing an ocean thermal energy conversion (OTEC) system utilizes the thrust produced by the sea water effluents resulting from the energy conversion process to position the vessel against wind and ocean current forces. In one preferred embodiment applicable to both cylindrical surface and spar buoy types of vessels, both the warm water and cold water discharges are collected in a common annular plenum and then discharged through nozzles spaced angularly around the periphery of the plenum. Each nozzle is rotatable through a 90° arc in a vertical plane to alter the direction of the discharge water jet and thereby to alter the horizontal component of the thrust or the driving force acting upon the vessel. The nozzles may be selected as to location and angular orientation to attain the net resultant force vector necessary to provide station-keeping or propulsion to the vessel under most any combination of wind and ocean current conditions.

12 Claims, 8 Drawing Figures

DYNAMIC POSITIONING SYSTEM FOR A VESSEL CONTAINING AN OCEAN THERMAL ENERGY CONVERSION SYSTEM

BACKGROUND OF THE INVENTION

This invention relates generally to ocean thermal energy conversion systems, and more particularly to improved means for dynamically positioning a vessel containing the energy conversion apparatus.

Various proposals have been made for utilizing the temperature difference between the warm surface waters of the tropics and the colder deep-water regions to operate a binary closed Rankine cycle energy conversion system. Such a system is generally known as a OTEC system, which is an acronym for ocean thermal energy conversion. The energy conversion system thermodynamically converts the thermal gradient of the ocean into electrical energy.

The vertical stability of the vessel containing the OTEC apparatus presents no unusual difficulty, because this is easily achieved by conventional hull structure and ballast designs well known in the ship-building industry. However, the horizontal positioning of the vessel that is required to overcome the forces of wind and ocean current poses unique problems because of the large hull displacement and the requirement for a huge cold water pipe that extends to unusual depths.

Several approaches have been considered for achieving horizontal positioning of the vessel by fixed moorings, such as by wire, chain, or synthetic rope. These approaches have several disadvantages in that they require excessive numbers and length of mooring legs, which involves very heavy and expensive equipment.

Dynamic positioning which involves conventional propeller thrusters has also been considered. However, it has been estimated that approximately 20% of the power produced by OTEC would be required to counteract the most extreme wind and current forces that might be encountered. For this reason and for reasons of high initial cost and large vessel space requirements, this method of dynamic positioning has been found lacking. It would be highly advantageous if a method of positioning could be devised which imposes minimum demands on the power plant and vessel configuration.

There are principally two different options which appear attractive for utilizing the electrical power produced by an OTEC system. One usage is the transmission of electrical power to shore, and the other is in the situ use of the electrical power for an energy intensive production process, such as ammonia manufacture, ore refining, and production of fuels such as hydrogen and methanol. The dynamic positioning requirements for each of these options is different in that fixed station keeping is required in the former and propulsion and steering is required in the latter.

SUMMARY OF THE INVENTION

This invention is predicated in part on the discovery that the combined capacities of the warm water and cold water supply systems required to meet the needs of an OTEC system are such as to produce effluent discharge forces that are more than sufficient to overcome the forces of wind and current acting upon the OTEC vessel.

According to the invention an OTEC vessel is provided with dynamic positioning means that takes advantage of propulsive forces produced by collecting and discharging the sea water effluents from the energy conversion system. The dynamic positioning means includes means for collecting the sea water effluents resulting from the energy conversion process, and means for controllably directing the discharge of the collected effluents in a plurality of different horizontal directions to attain a resultant net propulsive force acting in a preferred direction upon the vessel. The net propulsive force can be utilized for meeting both the station-keeping and propulsion requirements of the vessel.

DESCRIPTION OF THE PREFERRED EMBODIMENT

Figure 1:
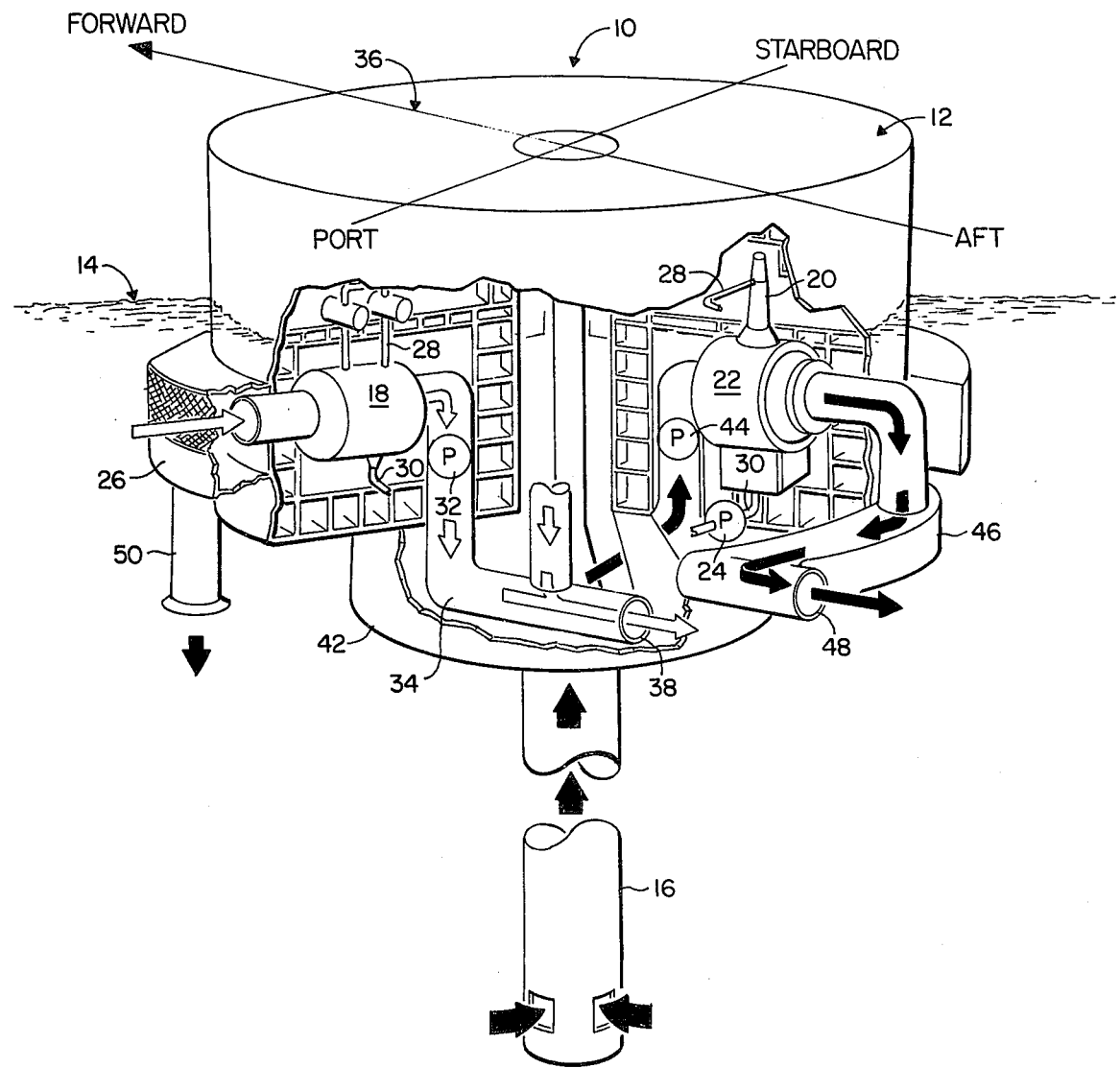
FIG. 1 is a diagrammatic view, in perspective, of a cylindrical surface sea-going vessel containing a ocean thermal energy conversion system in which the dynamic positioning means of the invention finds particular use for propulsion and steering.

Referring now to FIG. 1, there is shown a diagrammatic view of a sea going vessel 10, containing an ocean thermal energy conversion system. The vessel 10 generally may have a displacement of roughly 200,000 tons, and a diameter of over 300 feet, and can be designed to generate over a hundred megawatts. The vessel 10 is designed to utilize dynamic positioning for propulsion and steering for in situ use of the electrical power produced, as described above. The particular vessel 10 shown is of a type having a cylindrical surface hull 12 which extends above and below the surface 14 of the ocean in which the vessel 10 is displaced.

A cold water intake pipe 16 depends vertically from the lower portion of the hull 12 substantially along the vertical axis thereof and may extend to depths greater than 2,000 feet where it may reach the coldest regions of the ocean to obtain the low temperature necessary for condensing purposes as will be described more fully below. The intake pipe 16 is articulated, by means not shown, where it joins the hull 12 in order to isolate the pipe 16 from motions of the hull 12 which may be by wind and wave forces.

The OTEC system is modular in configuration and includes four power modules enclosed within the hull 12, only one power module of which is shown for simplicity of description. Each power module includes as principal components, an evaporator 18, a turbine-generator 20, a condenser 22, and a pump means 24 for circulating a working fluid, such as ammonia or propane, for example.

In operation, the working fluid in liquid state enters the evaporator 18 where it is heated and vaporized. The heat of vaporization for the working fluid is provided by warm ocean surface water which is ducted into the evaporator 18 from a warm water inlet plenum 26. The working fluid vapor is conducted by vapor pipe means 28 to the turbine-generator 20, where it is used to drive a turbine, which in turn drives a generator which produces electricity in a manner well known in the electrical power industry. The working fluid vapor leaving the turbine is condensed to a liquid in the condenser 22. The heat extracted from the working fluid vapor is transferred to cold water which is brought up through the cold water intake pipe 16 and is circulated through the condenser 22. The condensed liquid working fluid is conducted through liquid return pipe means 30 by working fluid pump means 24 to the evaporator 18, thereby completing the working fluid circuit.

In accordance with the invention, dynamic positioning of the vessel 10 is accomplished by ducting and directing the warm water and cold water exhausts in such manner as to provide thrust forces having direction and magnitude which counteract extreme wind and current force vector, for station-keeping, and to provide vessel propulsion and steering for movement to sites where greater temperature differential of the ocean water may be obtained.

Figure 2:
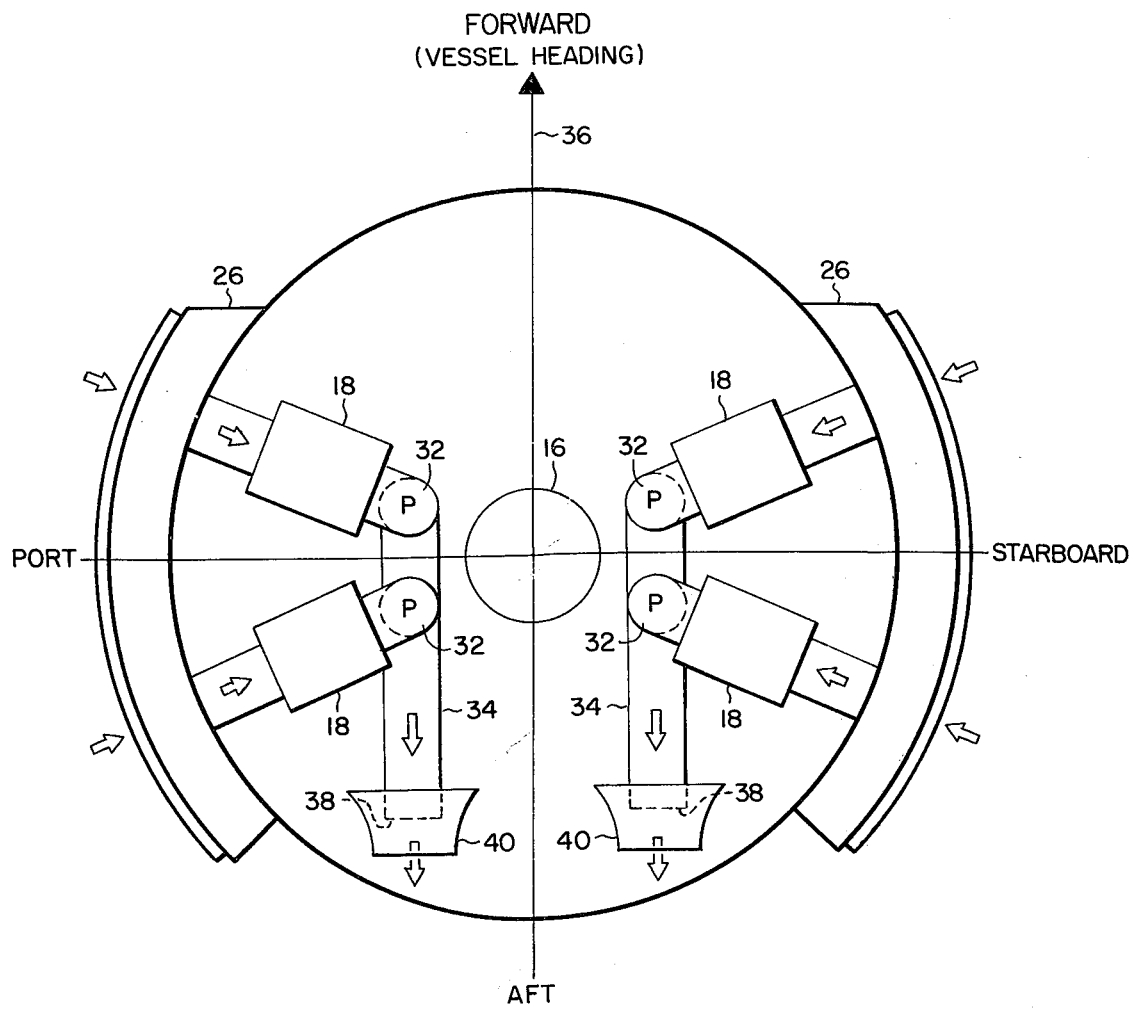
FIG. 2 is a plan view taken from several different elevations of the hull of the vessel shown in FIG. 1 and illustrating the warm water circulating system and orientation of principal components thereof.

The warm water circulating system will be described first with reference to both FIGS. 1 and 2, the path of the warm water being indicated by light arrows. Warm water from the ocean surface is collected by starboard and port warm water inlet plenums 26 each comprising an arcuate shaped peripheral duct with screened intake. The plenums 26 are diametrically opposed and extend approximately over a 90° arc. Each plenum 26 provides warm inlet water to two evaporators 18.

The warm water is ducted from the evaporator 18, where it transfers its thermal energy to the working fluid, to a warm water circulating pump 32, and thence to a discharge manifold 34 below. Each discharge manifold 34 receives the warm water discharge from two evaporators 18. There are two discharge manifolds 34 on opposite sides of the fore and aft axis 26 extending horizontally and parallel to the axis 36. Each discharge manifold 34 has its discharge orifice 38 directed horizontally aft of the vessel for propulsion and is provided with a movable shroud 40, surrounding the orifice 38, which is movable in a horizontal plane for directing the warm water jet in different angular directions for steering purposes.

Figure 3:
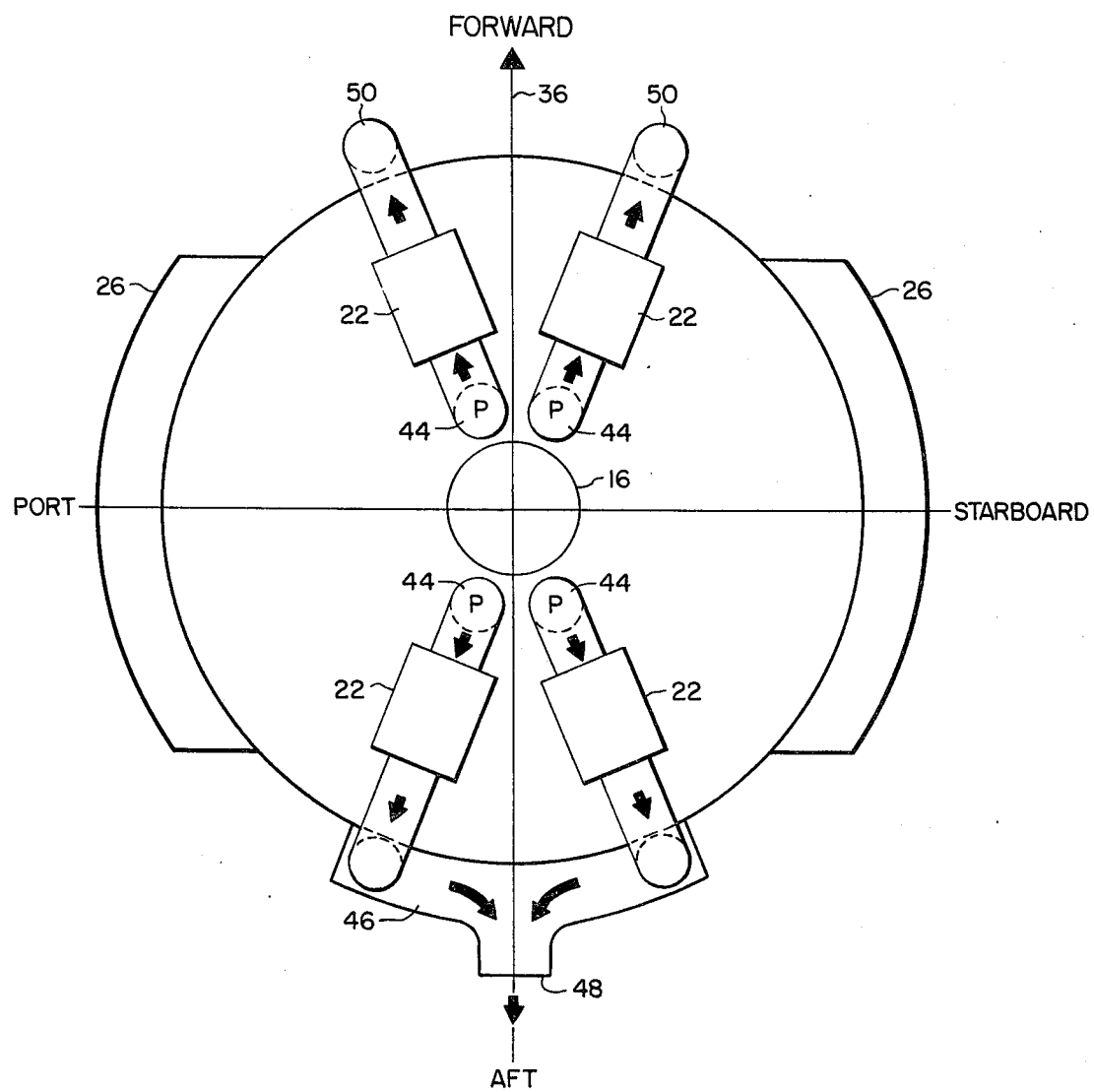
FIG. 3 is a plan view similar to FIG. 2 showing the cold water circulating system and orientation of principal components thereof.

The cold water circulating system is described with reference to FIGS. 1 and 3, the path of the cold water being indicated by dark arrows. The cold water circulating system includes the cold water intake pipe 16 which provides a conduit for the cold water from the ocean depths to a cold water plenum 42 that is common to the four condensers 22. From the plenum 42, the cold water is pumped through each condenser circuit by means of a cold water circulating pump 44 located on the intake side of each condenser 22. After extracting heat from the working fluid vapor in the condenser 22, the cold water is discharged.

The cold water discharge from each of the condensers 22 located in the aft section of the hull is ducted to a common cold water exhaust plenum 46 where it exits through a single cold water exhaust nozzle 48. This nozzle is fixed and is directed horizontally aft along the fore and aft axis 36 so that the discharge jet provides constant unidirectional thrust or propulsive force. If desired, a movable shroud similar to the warm water shrouds 40 may be provided around the exhaust nozzle 48, if additional steering capability is required.

Design criteria based on a study of tropic wind and ocean current conditions indicate that the four warm water evaporator discharges and the two cold water condenser discharges already described provide sufficient propulsion and steering forces for dynamic positioning of this type of vessel 10. The discharge from each of the two condensers 22 located in the forward hull section is in excess and is therefore directed separately in a vertically downward direction through forward cold water exhaust nozzles 50. This is done to avoid thermal dilution of the warm water entering the warm water inlet plenum 26, and to dispense with additional ducting to bring the discharge streams to the aft portion of the vessel 10.

The study-developed design criteria is based on an estimated station-keeping force approximating 750,000 pounds required for a vessel 10 containing a 100 megawatt OTEC system with a 3,000 foot cold water pipe deployed in maximum storm conditions of 100 knot wind, 60 foot wave height and 2 knot surface current. However, since current velocities for most of the OTEC sites studied are normally 0.7 to 0.9 knots and wind velocities normally 10 to 25 knots, the vessel 10 will be making headway of 15 to 20 miles per day for the majority of time it is in operation.

The dynamic positioning system above described is designed for providing propulsion and steering capability to the vessel 10 for in situ use of the electrical power generated by the OTEC system. In some applications, it may be desired to transmit the generated electrical power to a shore-based distribution facility for consumer use. In this usage, the vessel 10 is constrained to a relatively small circle of position by the connection to the electrical power transmission cable, which is fixed to the ocean bottom. The dynamic positioning system for the vessel 10 must be modified somewhat to accommodate these station-keeping requirements. These requirements are met in the next embodiment to be described by changing the warm water intake and the cold and water water discharge ducting configuration.

The warm water circulating system for the next embodiment will first be described with reference to FIGS. 4, 5, and 6. Warm water from the ocean surface is collected through a forward screened intake opening 52 in an arcuately shaped peripheral duct forming a warm water inlet plenum 54 which is located just beneath the water surface 14 and surrounds a major peripheral portion of the hull 12. The opening 52 in the warm water inlet plenum 54 extends approximately over a 60° arc that is bisected by the fore and aft axis 36. The dynamic positioning system is designed to orient the vessel 10 so that the fore and aft axis 36 is maintained parallel to the direction of the ocean current and the vessel 10 is pointed in a direction opposing the current, as shown in FIG. 5. Vessel orientation in this manner is required to assure that the warm water system inlet is always positioned to receive warm surface intake water from a fresh source, provided by the current, that is undiluted by the station-keeping discharge effluents.

As shown in FIG. 5, the warm water inlet plenum 54 provides warm inlet water to all four evaporators 18. As shown in FIG. 4, the evaporators 18 are located in a horizontal plane on a level with the warm water inlet plenum 54. The warm water is ducted from the evaporators 18, where it transfers its thermal energy to the working fluid, to the warm water circulating pumps 32, and through ducts 54 to an annular, or combined warm water and cold water discharge plenum 58, as shown in FIG. 6. The discharge plenum 58 is located in a horizontal plane below the hull 12 and surrounds the cold water intake plenum 42, as shown in FIG. 4. The discharge plenum 58 collects not only the warm water discharge but also the cold water discharge, as will now be described.

Referring back to FIGS. 4 and 5, the cold water circulating system includes the cold water intake pipe 16 which conducts the cold water to the cold water intake plenum 42 common to the four condensers 22. The cold water is pumped from the cold water intake plenum 42 through each condenser circuit by means of the cold water circulating pump 44. After extracting heat from the working fluid vapor in the condensers 22, the cold water, now somewhat warmer but still colder than the warm surface water, flows through ducts 60 and into the annular discharge plenum 58, shown in FIGS. 4 and 6, where it mixes with the warm water discharge.

Figure 6:
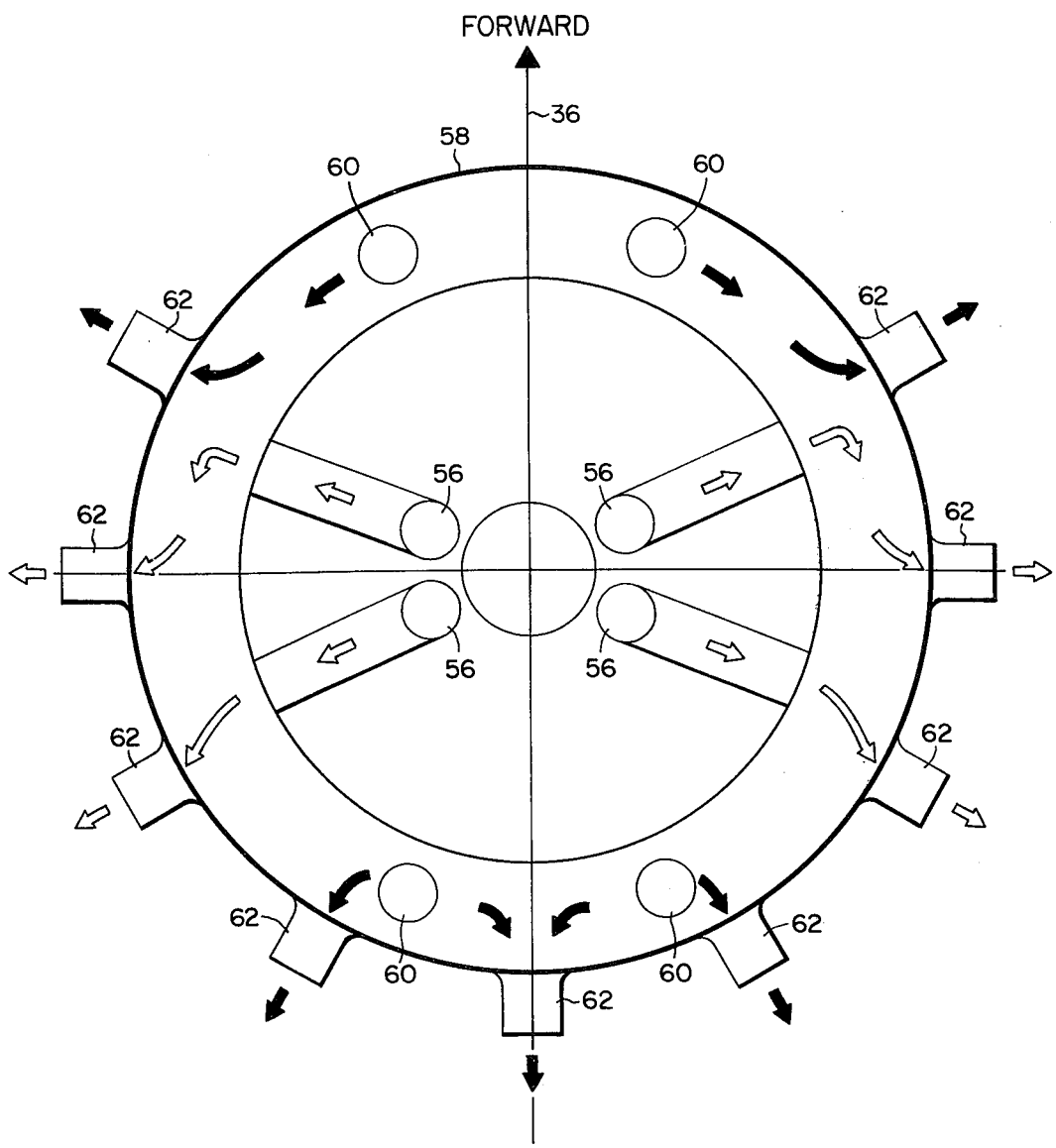
FIG. 6 is a plan view of the hull taken at a lower elevation showing the warm water and cold water exhaust collection and discharge.

As shown more clearly in FIG. 6, the annular discharge plenum 58 is provided with a plurality of outlet nozzles 62 extending outwardly from the outer periphery of the annulus defining the discharge plenum 58. The outlet nozzles 62 are angularly spaced about a major arcuate portion of the annulus, the nozzles 62 being omitted from a minor arcuate portion of the annulus that faces forward and lies directly below the warm water intake opening 52. Omission of the nozzles 62 beneath the warm water intake opening 52 prevents thermal dilution of the warm water by the discharge effluents. In the embodiment shown, for example, there are nine outlet nozzles 62 spaced 30° from each other, of which a single outlet nozzle 62 is located aft, four nozzles are located on the port side, and four nozzles are located on the starboard side.

Figure 4:
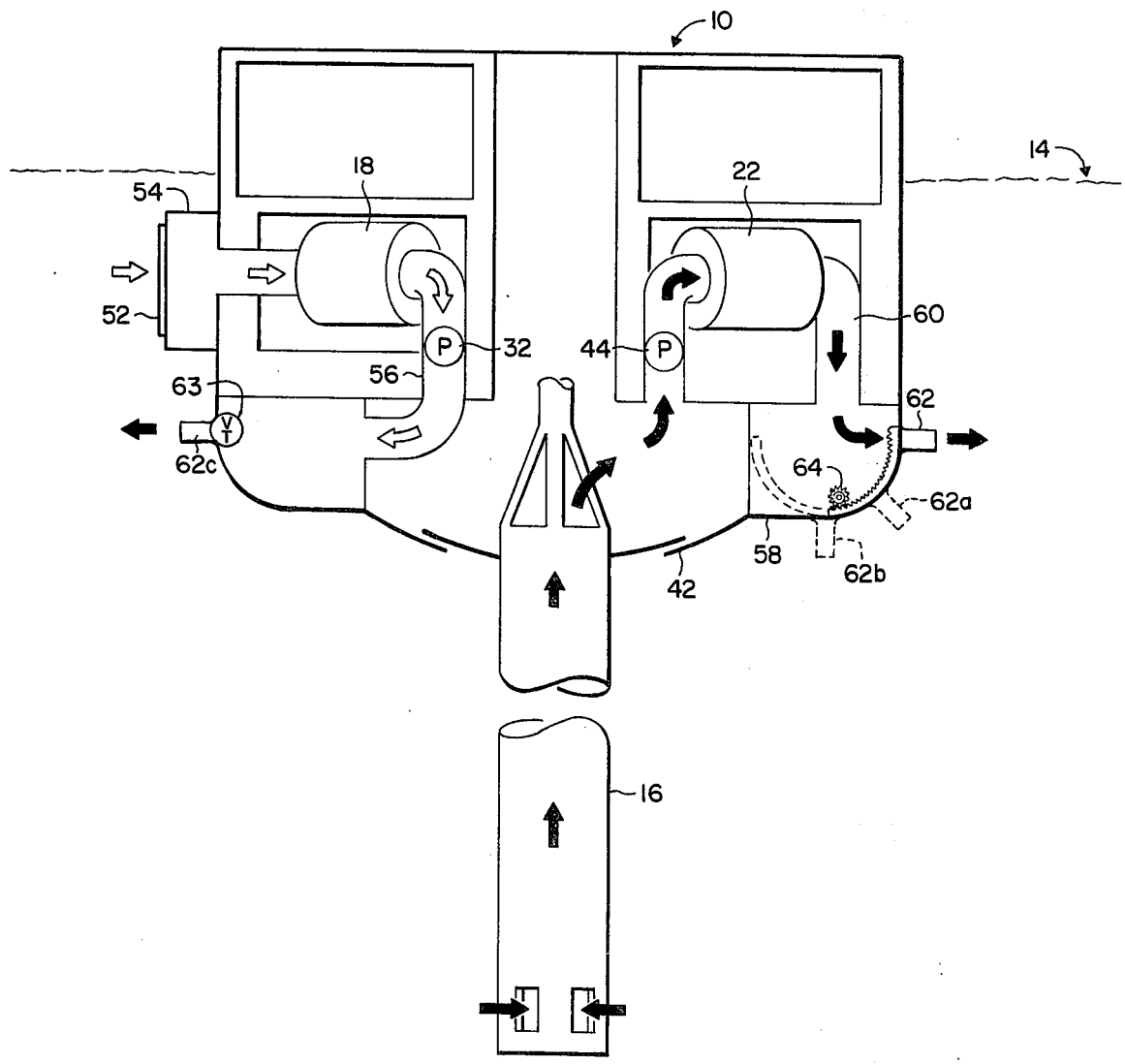
FIG. 4 is a front elevation view, partly diagrammatic, of the vessel of FIG. 1 in which a modified form of dynamic positioning means finds particular use for station-keeping.
Figure 5:
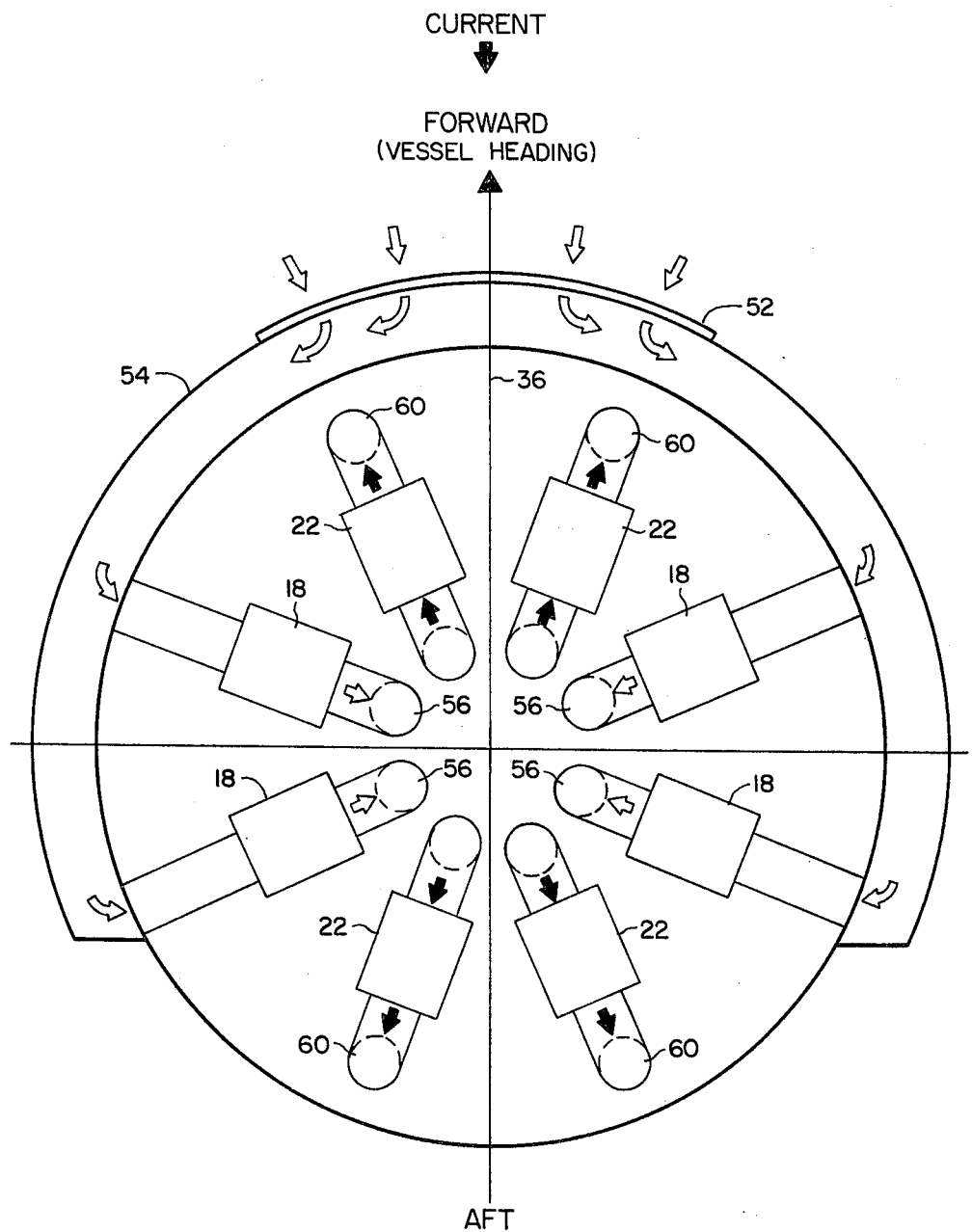
FIG. 5 is a plan view of the hull taken at one elevation showing the warm water and cold water intake ducting and circuiting of the system shown in FIG. 4.

As is shown more clearly in FIG. 4, each of the nozzles 62 may be rotated in a vertical plane through a 90° arc so that the direction of the discharge stream can be varied between horizontally outward and vertically downward. A worm gear movement 64 is shown as exemplary means for rotating the nozzles 62 in a vertical plane. In FIG. 4, three positions of a nozzle 62 are depicted. The solid lines show the nozzle labeled 62 in a first position pointing horizontally outward, and the two sets of dotted lines show the nozzle labeled 62a in a second position pointing angularly downward and the nozzle labeled 62b in a third position pointing vertically downward.

With the discharge nozzle directed horizontally, as in the first position and labeled 62, the horizontal vector of the propulsive force is maximum. With the discharge nozzle directed angularly downward an angle less than 90°, as in the second position and labeled 62a, the horizontal component of the propulsive force vector is less than maximum and is equal to the force vector multiplied by the cosine of the angular displacement of the nozzle from the horizontal. With the discharge nozzle directed vertically downward, as in the third position and labeled 62b, the horizontal component of the propulsive force vector is zero.

It can be seen that the angular position of each nozzle 62 in the vertical plane determines the amount of horizontal propulsive force provided by the water discharged therefrom. The angular location of each nozzle about the periphery of the annular discharge plenum 58 determines the direction of the propulsive force on the vessel 10, although the maximum force propelling the vessel forward or to port or starboard is much greater than the maximum force propelling it rearward. It is readily seen that the angular displacement of each nozzle 62 can be adjusted so that the summation of all the horizontal force vectors provided by the discharge waters will provide a resultant force vector that is equal and opposite to the wind and current force vector acting on the vessel. In such circumstances, the dynamic positioning system acts on the vessel to provide station-keeping. The desired condition is to keep the vessel 10 within a circle of position as constrained by its attachment to the power transmission cable. Any change in wind and/or current conditions that tend to move the vessel 10 away from its orientation counter the current or outside its circle of position can readily be offset by selecting the appropriate nozzle or nozzles and their angular displacements.

It should be noted that the discharge jet at each nozzle location may alternatively be throttled or shut off by valve control means instead of having its angular direction varied as indicated above. The throttled discharge would the be diverted to another nozzle location or locations to increase the thrust at those locations. Referring back to the left hand portion of FIG. 4, for example, a throttle valve 63 is positioned on the inlet side of a nozzle 62c which is fixed in the horizontal position.

While the embodiment of FIGS. 4–6 is especially advantageous to provide station keeping for the vessel 10, it is readily apparent that it is capable of providing propulsion to the vessel 10 as well. All that is necessary is to select for maximum horizontal thrust only those nozzles that are directed aft, and to direct the angular orientation of the forward nozzles vertically downward, or throttle them.

The dynamic positioning means may also be applied to a different kind of vessel known as a spar buoy. The spar buoy design is especially adapted for external mounting of the power modules, thus facilitating their removal for maintenance and work-over.

Figure 7:
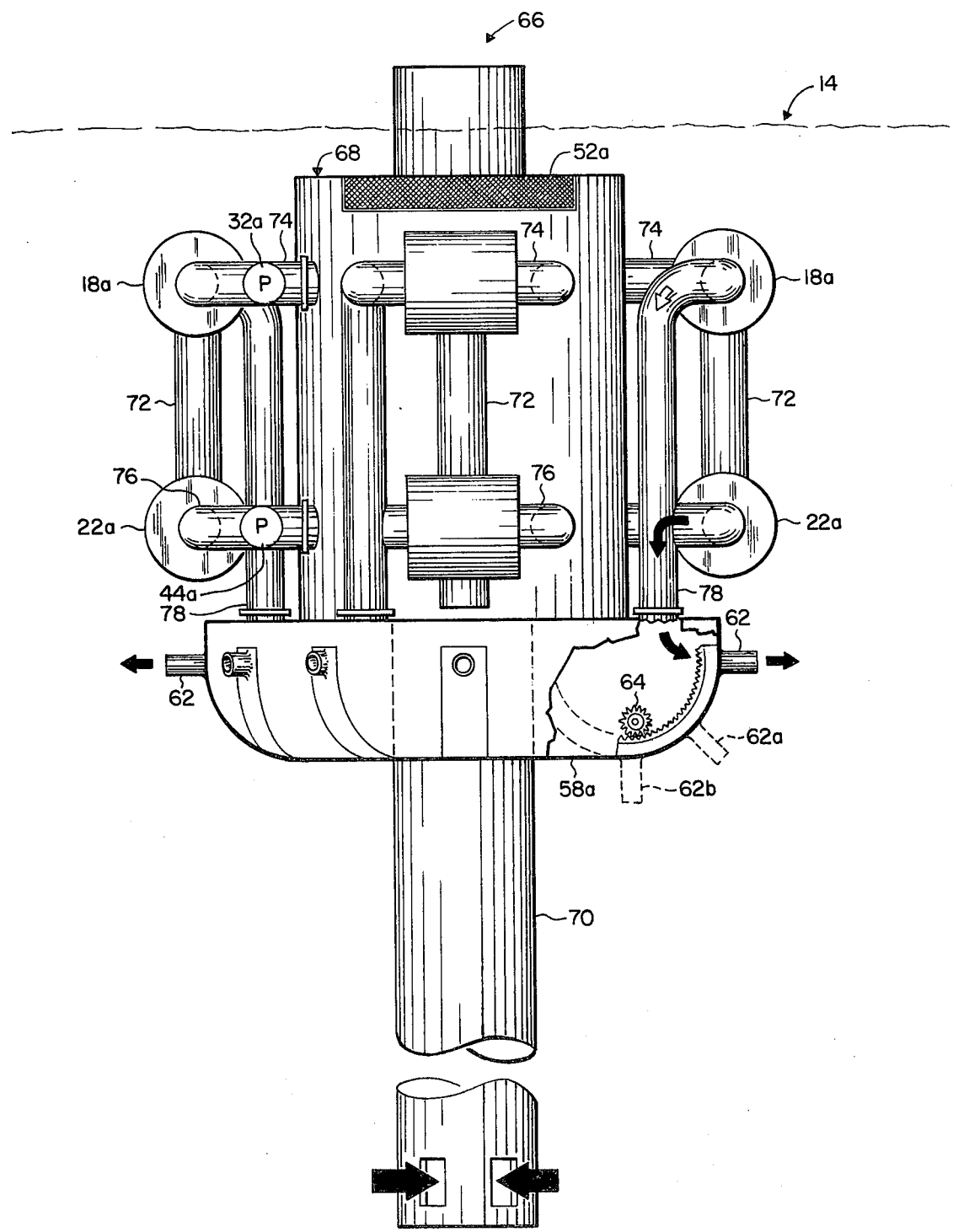
FIG. 7 is a front elevation, partly diagrammatic and with portions removed, of a spar buoy sea-going vessel incorporating dynamic positioning means similar to that shown in FIGS. 4–6.
Figure 8:
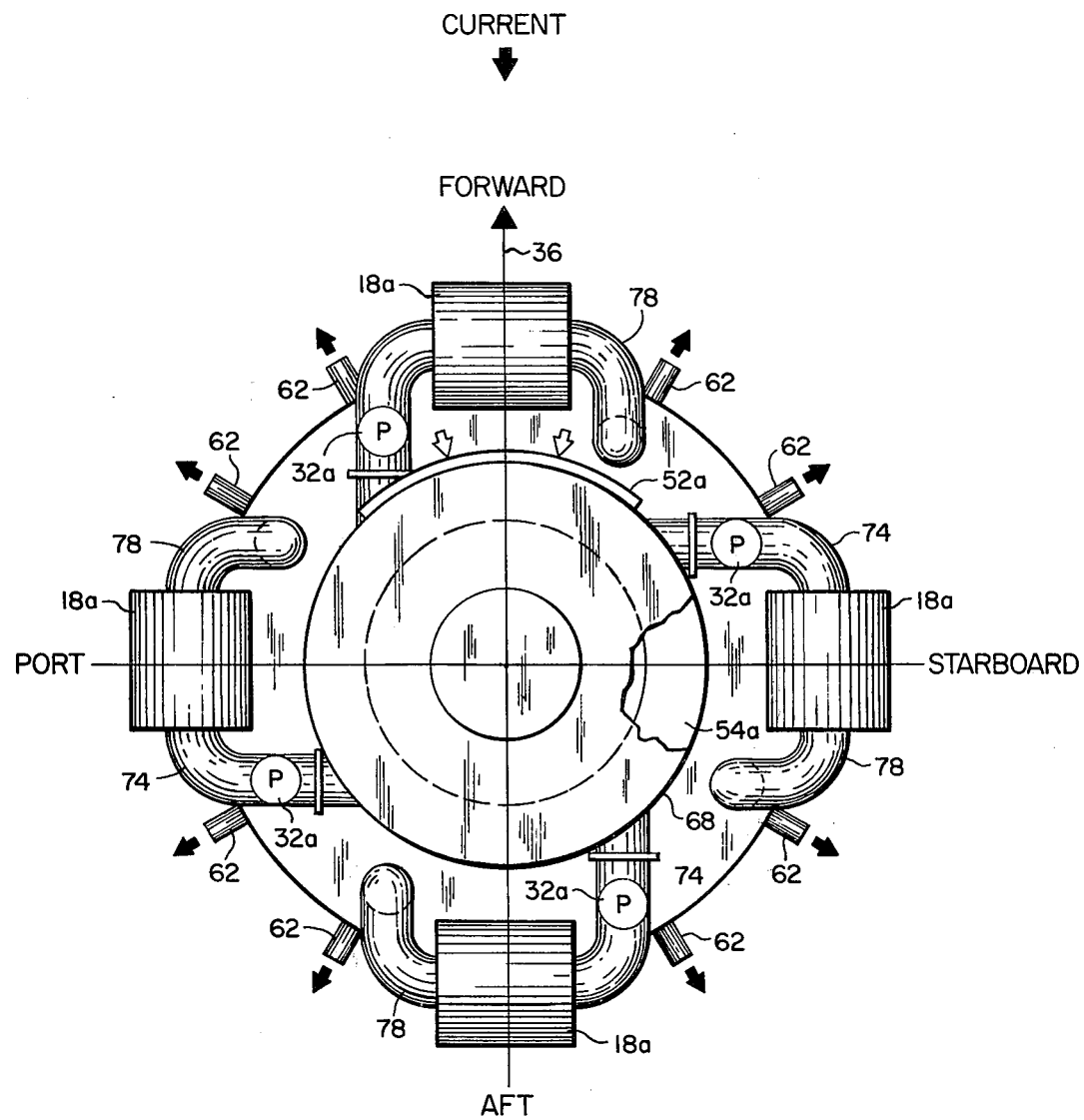
FIG. 8 is a top plan view of the spar buoy vessel of FIG. 7 showing the orientation of four detachable power modules.

Referring now to FIGS. 7 and 8, a spar buoy vessel 66 has a cylindrical hull 68 and cold water pipe 70 rigidly attached thereto to form an integral unit. The rigid attachment of the pipe 70 to the hull 68 is one feature that distinguishes the spar buoy vessel 66 from the cylindrical surface vessel 10 of FIG. 1, which has its cold water pipe and hull articulated, as described above. The vessel 66 has a rather elongated shape, and typically the diameter of the hull 68 is not substantially larger than the diameter of the cold water pipe 70.

Another distinguishing feature of the spar buoy vessel 66 is that the evaporator and condenser components of its power modules are vertically oriented. Four power modules are shown arranged around the outer periphery of the hull 68. Each power module includes an evaporator 18a located above a condenser 22a and separated therefrom by a connecting housing 72. The housing 72 encloses the inner connecting working fluid piping, the working fluid pump, and the turbine generator, all of which function in a similar manner to the modules of the cylindrical surface vessel 10 above described.

An upper horizontal warm water intake pipe 74 leading into the evaporator 18a is attached to the outer cylindrical surface of the hull 68. The warm water intake pipe 74 encloses a warm water circulating pump 32a.

Similarly, a lower horizontal cold water intake pipe 76 leading into the condenser 22a attaches to the outer cylindrical surface of the hull 68, and houses a cold water circulating pump 44a. The pipes 74 and 76 provide two of the points of attachment for facilitating removal and replacement of the power modules.

The warm water is supplied to the evaporator 18 from a warm water inlet plenum 54a having its screened intake opening 52a located at the highest elevation of the hull 68. The dynamic positioning system is designed to orient the vessel 66 so that the heading is in a direction opposing the ocean current for the same reasons previously described.

An annular discharge plenum 58a serves to collect the warm water and cold water discharges. The discharge plenum 58a lies in a horizontal plane beneath the hull 68 and surrounds the cold water pipe 70. The discharge plenum 58a has a substantially larger external diameter than the hull 68 and has a flat upper surface of extended area to provide supporting attachment for all four power modules. Thus, the third point of attachment for each power module is provided by a warm water and cold water collecting manifold 78 extending vertically between outlets in the evaporator 18a and condenser 22a and attached at its base to the upper surface of the discharge plenum 58a. The manifold 78 conducts the warm water discharged from the evaporator 18a and the cold water discharged from the condenser 22a into the discharge plenum 58a.

Because the rather elongated design of the spar buoy hull 68 results in a substantial separation of the warm water intake opening 52a from the discharge plenum 58a, the potential for thermal dilution of the warm surface water by the cooler discharge effluents is minimized. Accordingly, the discharge nozzles 62 are angularly spaced uniformly around the periphery of the discharge plenum to provide the dynamic positioning system with a wider range of control over the combined propulsion, steering, and station-keeping requirements. As in the embodiment previously described, the nozzles 62 are adjustable vertically through a 90° arc to alter the respective horizontal component of the propulsive force vector. Alternatively, the nozzles may be fixed in horizontal position and provided with valve means to throttle the water discharge.

What is claimed is:

1. In combination with a vessel containing a system for an ocean thermal energy conversion process in which heat is extracted from warm ocean surface waters to vaporize a working fluid liquid and heat is rejected to cold waters collected from the lower depths of the ocean to condense the working fluid vapor, the improvement in a dynamic positioning means utilizing the sea water effluents resulting from said energy conversion process for positioning the vessel, said dynamic positioning means comprising:
   a. means aboard said vessel for collecting said sea water effluents resulting from said energy conversion process; and
   b. means aboard said vessel for controllably directing the discharge of said collected effluents in a plurality of different horizontal directions to attain a resultant net propulsive force acting in a preferred direction upon said vessel.

2. The inventory according to claim 1, wherein the means in (b) includes a plurality of discharge orifices, at least some of which are provided with surrounding movable shrouds for directing the effluents discharged therefrom in different angular directions.

3. The invention according to claim 1, wherein the means in (b) includes a plurality of discharge orifices, at least some of which are mounted for angular rotation in a vertical plane between horizontal outward position and vertical downward position.

4. The invention according to claim 1, wherein said vessel has a fore and aft axis, and wherein the means in (b) includes a plurality of discharge orifices aligned parallel with said fore and aft axis.

5. The invention according to claim 4, wherein at least two of said orifices lie in opposing sides of said axis substantially equidistant therefrom.

6. The invention according to claim 5, wherein an additional orifice lies along said axis.

7. The invention according to claim 1, wherein said dynamic positioning means includes an annular discharge plenum disposed horizontally for collecting both the warm and cold sea water effluents and for discharging the combined effluents in a plurality of different directions.

8. The invention according to claim 7, wherein said annular discharge plenum is provided with a plurality of discharge orifices angularly spaced about at least a peripheral portion of said plenum.

9. The invention according to claim 8, wherein each of said orifices are formed in a nozzle that is rotatable angularly in a vertical plane so as to alter the horizontal component of the thrust vector provided by the discharge of effluents therefrom.

10. The invention according to claim 1, wherein said discharge orifices are omitted from a minor arcuate portion of said plenum facing forward of said vessel.

11. The invention according to claim 10, wherein said discharge orifices are equally spaced around the annular extent of said plenum.

12. The invention according to claim 1, wherein the means in (b) includes a plurality of discharge orifices, at least one of which includes throttle valve means for controlling the discharge from that orifice.

* * * * *